June 13, 1933.    F. W. PRESTON    1,913,455
METHOD OF AND APPARATUS FOR WORKING PLASTIC MATERIALS
Filed June 30, 1931    3 Sheets-Sheet 1
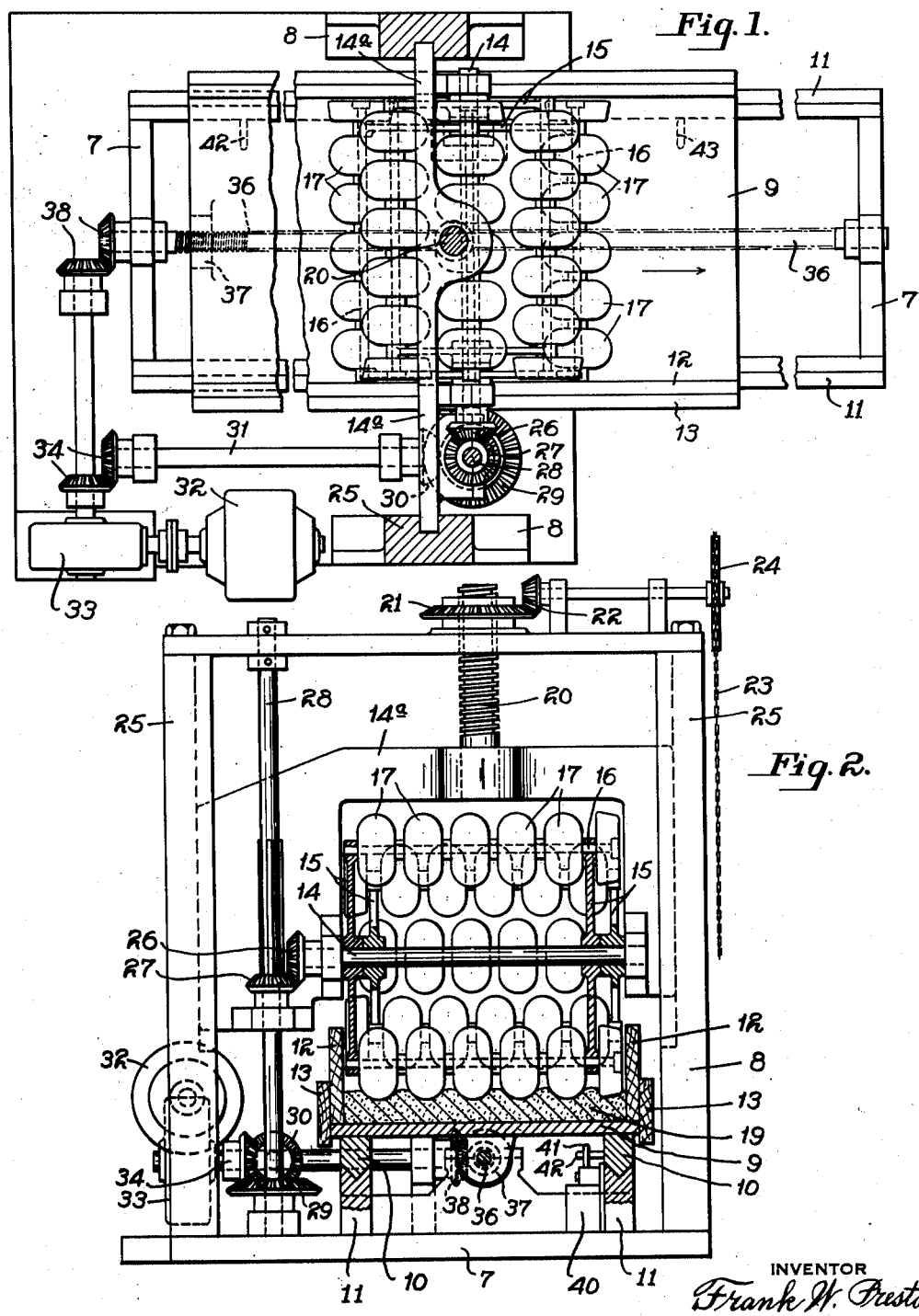

June 13, 1933. F. W. PRESTON 1,913,455
METHOD OF AND APPARATUS FOR WORKING PLASTIC MATERIALS
Filed June 30, 1931 3 Sheets-Sheet 2

INVENTOR
Frank W. Preston,
By Archworth Martin,
Attorney.

June 13, 1933. F. W. PRESTON 1,913,455
METHOD OF AND APPARATUS FOR WORKING PLASTIC MATERIALS
Filed June 30, 1931 3 Sheets-Sheet 3

INVENTOR
Frank W. Preston,
By Archworth Martin,
Attorney.

Patented June 13, 1933

1,913,455

UNITED STATES PATENT OFFICE

FRANK W. PRESTON, OF BUTLER, PENNSYLVANIA

METHOD OF AND APPARATUS FOR WORKING PLASTIC MATERIALS

Application filed June 30, 1931. Serial No. 547,824.

My invention relates to the manufacture of refractory blocks and the like, of plastic material such as clay.

In the manufacture of plastic bodies, and particularly those formed of plastic clay, it is highly desirable that the finished bodies contain a minimum of voids and entrapped air, and that they be free of seams or laminations. The strength and durability of the blocks depend somewhat, of course, upon the density or compactness of the material entering into the structure thereof.

One object of my invention is to provide a means and a method whereby clay in a plastic condition may be kneaded and compacted in such manner that the finished article is of maximum density and wherein there is close adherence of the clay particles to one another so that the article is not only quite dense but is highly resistant to breakage or disintegration.

Another object of my invention is to provide an improved form of apparatus for operating upon plastic material.

Still another object of my invention is to provide an apparatus wherein plastic bodies may be shaped with great rapidity and nevertheless be possessed of the various desirable qualities above referred to.

Figure 3:
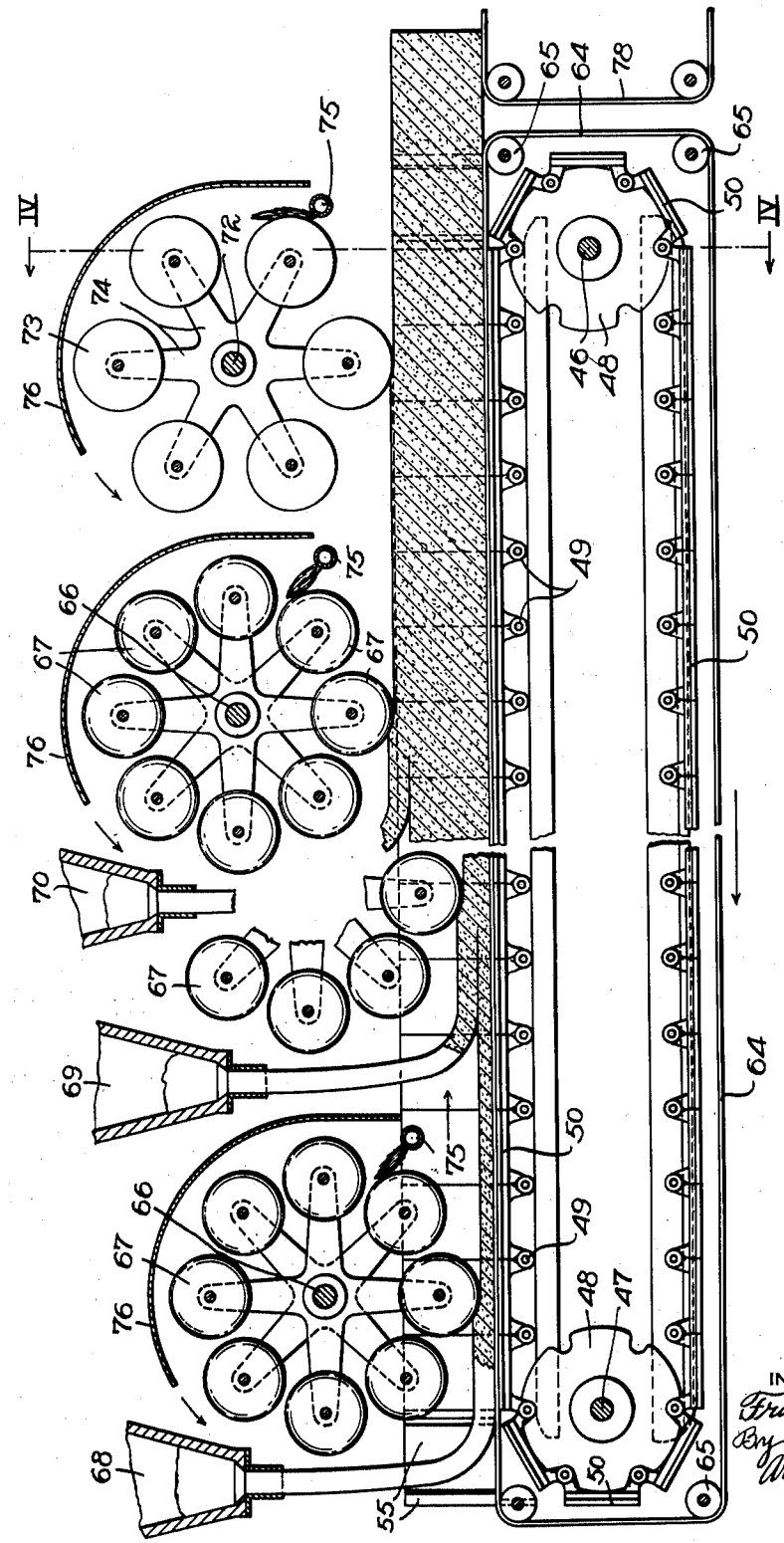
Figure 4:
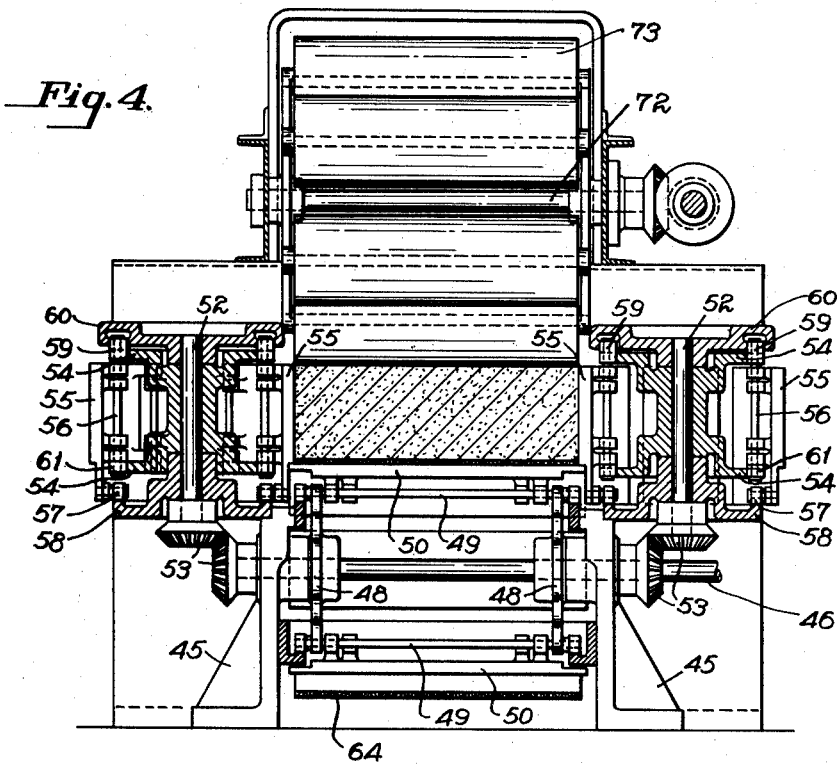
Figure 5:
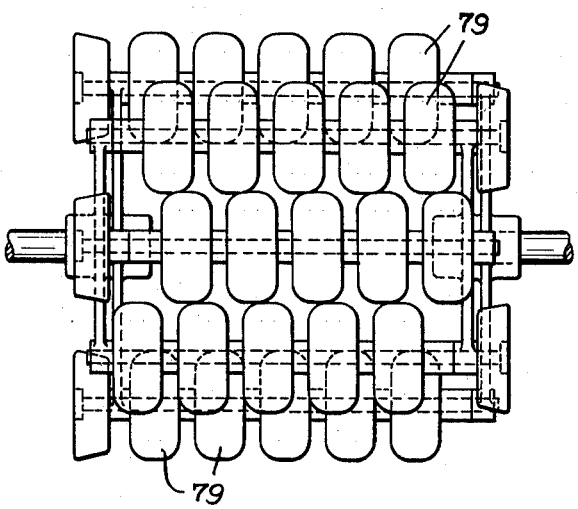

Some of the forms of apparatus by which my invention may be practised are shown in the accompanying drawings wherein Figure 1 is a sectional plan view of one type of machine; Fig. 2 is a cross sectional view thereof in end elevation; Fig. 3 shows a modification of the structure of Figs. 1 and 2, it being a broken view in longitudinal section; Fig. 4 is a view taken on the line IV—IV of Fig. 3, and Fig. 5 shows a modification of the compacting or kneading rollers of the other figures.

Referring first to Figs. 1 and 2, I show a base 7 and a framework 8 within which a table 9 is slidably supported. The table 9 has rails 10 secured to its underside and is slidably supported upon slideways 11 for reciprocable movement. The table is provided with side boards 12 which may be removably held in place by cleats 13 secured to the edges of the table 9.

A shaft 14 is supported on a vertically-adjustable frame 14a and carries a number of arms or spiders 15 that are rigidly secured thereto. The arms at their outer ends support shafts 16 that carry clay-kneading rollers 17. The rollers 17 may be either keyed to the shafts 16 and said shafts rotatably supported on the spider arms 15 or the rollers 17 may be loosely journalled on the shafts 16. In any event, the rollers 17 have idling movement with respect to the shaft 14 to which the spiders are secured. The rollers on each shaft 16 are offset axially with respect to the rollers on the adjacent shafts, so that portions of clay not engaged by one set of rollers 17 is engaged by another set thereof.

The vertical adjustment of the frame 14a, in order to vertically position the shaft 14 and the rollers 17 at proper distance above the mass of plastic clay 19 being operated upon, is effected by means of a screw shaft 20 that is journalled in the upper portion of the frame 14a and which has threaded engagement with the hub of a bevel gear wheel 21 that is rotatably supported upon the main framework 8. A bevel pinion 22 meshes with the gear wheel 21 and is operated by a chain 23 that passes over a sprocket wheel 24 that is secured to the shaft which carries the pinion 22. This chain may be manually operated, if desired, to effect raising and lowering of the kneading rollers 17.

The adjustable frame 14a is slidably supported at its ends in vertical guides 25 that are carried by or constitute part of the framework 8. The shaft 14 carries a bevel gear wheel 26 that meshes with a pinion 27 which is slidably keyed to a vertical shaft 28, the pinion 27 being supported on a horizontally-extending portion of the frame 14a, so that it will always remain in mesh with the gear wheel 26 at various vertical positions of the frame 14a. By reason of the slidable key connection with the shaft 28, the pinion 27 will also have driven connection with such shaft at all times.

The shaft 28 carries at its lower end a gear bevel wheel 29 that meshes with a bevel pinion 30 which is carried by a shaft 31 that is driven from a motor 32, through a worm reducing gear structure 33, and gear bevel wheels 34.

A screw shaft 36 is journalled in the base 7 and has threaded engagement with a nut-like extension 37 secured to the underside of the table 9. The shaft 36 is driven by the reduction gear 33 through bevel gears 38, to effect reciprocation of the table along the slideways 11, through turning of the shaft 36 alternately in opposite directions.

Assuming that the motor 32 is being driven in such direction that the table moves in the direction indicated by the arrow in Fig. 1, when the table reaches the end of its travel in that direction, the motor will be reversed by a reversing switch 40 which has an operating lever 41 that is engaged by a stop pin 42 carried by the table, thereby causing the motor 32 and the shaft 36 to be turned in the opposite direction, and thus effecting travel of the table in the reverse direction.

When the table has reached its other extreme position, a stop pin 43 carried thereby will operate the switch 40 to again reverse the direction of travel of the motor and the table. The table 9 can be of any desired length, for example, thirty feet, depending upon the desired rate of production and upon the size of blocks it is desired to manufacture. When blocks of considerable length are made on the machine, they can, of course, be thereafter cut to form a plurality of smaller blocks.

At the beginning of a block-forming operation, the kneading rolls 17 are positioned close to the bottom board of the table 9. Plastic clay is then dumped upon or fed to the table and the table is moved along the slideways 11 to carry the clay beneath the rollers 17. The shaft 14 is driven in such direction that the rollers 17 are brought against the mass of clay in a direction parallel to that in which the table is traveling. The gear reduction is such that the peripheral speed of the spiders 15 is much greater than the rate of linear movement of the table, and when the rolls 17 touch the clay they are therefore caused by the frictional contact with the clay to rotate on their axes 16 in the direction opposite to that in which the table and the spiders are moving.

The rollers squeeze the clay against the table and tend to push it ahead on the table to thereby exert a kneading and compacting action thereon. Each transverse row of rollers 17, of course, effects some displacement of the clay laterally of the table, but the succeeding set of rollers corrects this displacement and engages portions of the clay not operated upon by the proceeding set of rollers. The clay thus gets worked very thoroughly.

Clay can be supplied to the table when it travels in either direction, and as the direction of rotation of the shaft 14 is necessarily changed each time that there is a reversal of direction of movement of the table, the apparatus is operable in either direction to compact and work newly introduced clay.

As the clay body is built up on the table, the frame 14a is periodically raised to elevate the rollers 17 somewhat. After the clay block has been built up to the desired thickness, it may be struck off by a scraper bar or smoothed and struck off by a roller as hereinafter described in connection with Fig. 3, or not, as desired. The table and the block may then be removed from the machine or a base board can be separably mounted on the table and lifted clear of the machine with the block so that the machine can be again operated to form another block.

Referring now to Figs. 3 and 4, I show a modified form of apparatus for operating upon clay after somewhat the same manner as just described in connection with the discussion of Figs. 1 and 2. The modified form of apparatus, however, is what might be termed a traveling or continuous type wherein the table has continuous movement after the manner of an endless conveyer, instead of reciprocatory movement.

A conveyer frame 45 carries shafts 46 and 47 each of which has a pair of sprocket-like wheels 48 that are notched for the reception of bars 49, to which table sections 50 are pivotally connected, the bars 49 and the table sections 50 constituting in effect an endless conveyer or chain of the caterpillar tractor type.

A pair of vertical shafts is journaled in each end of the framework and one pair 52 of these shafts has driving connection through bevel gear wheels 53 with the shaft 46 which may be driven from any suitable source of power. Of course, both shafts 46 and 47 may be driven from a given source of power, but it may be sufficient to have only the shaft 46 driven. The shafts 52 carry sprockets 54 similar to the sprockets 48 and serve to drive endless conveyers of the caterpillar type embodying wall sections 55 and hinge pins 56 corresponding to the table sections 50 and the bars 49, except that the belt sections 55 are provided with extensions that carry rollers 57 which rest upon track ways 58 to afford vertical support for the belt or conveyer sections 55. At their ends, shafts 56 carry vertical rollers 59 that move in channel guides 60 and at their lower ends carry rollers 61.

The rollers 59 and 61 engage the teeth of the sprocket wheels 54 and thereby reduce friction. The lateral support afforded the rollers 59 by the channel rail 60 prevents lateral displacement of the conveyer sections 55 through pressure of the clay.

A belt 64 of sheet-like material passes around pulleys or rollers 65 and surrounds the lower conveyer, so as to overlie the conveyer sections 50 on their upper run and prevent clay being forced into the spaces between the conveyer sections. One or more of the rollers 65 may be driven or the belt may simply have idling movement by reason of its frictional contact with the table. Similar covers may be provided for movement with the conveyer sections 55.

Several groups of clayworking elements are disposed longitudinally of the conveyer table and the number employed will depend largely upon the thickness of the blocks which it is desired to form. These units are mounted on shafts 66 which are successively positioned at relatively higher levels so that the compacting and kneading rollers 67 will be at the proper distance above the mold table, as the thickness of the plastic mass increases through the addition of material thereto as it travels along the with the conveyer. The shafts 66 may be driven in any suitable manner, and the rollers 67 are journalled thereon as described in connection with Figs. 1 and 2, the shafts being preferably driven at such speed that the rollers will contact with the clay at a faster rate of speed than that at which the conveyer is traveling. The clay is fed to the conveyer table from the discharge spouts or hoppers 68, 69 and 70, which may be associated with pug mills.

The drawings show clay being introduced in advance of each set of rollers 67, but it will be also understood that as many spouts and sets of rollers will be provided as is necessary to build a block to a desired thickness, and to properly work the clay.

As the clay approaches the discharge end of the conveyer it passes beneath a smoothing roll unit that is mounted on a shaft 72 which carries rollers 73 loosely journalled on the spider arms 74 that are secured to the shaft. Since the rollers 73 are each of a length equal to the width of a block, and the shaft 72 is rotated rapidly relative to the speed of travel of the conveyer, they exert a smoothing or striking-off action on the top surface of the block.

In order to prevent clay sticking to the rolls 67 and 73, I heat said rolls by means of gas jets 75, shields 76 being provided to retain the heat in the vicinity of the rolls. I have found that by this arrangement it is not necessary to oil the rolls in order to prevent sticking of the clay. The rolls could, of course, be heated also electrically, or in some other manner. The surface of the rolls may be brought to a temperature of perhaps 300° F., depending upon the wetness of the clay and its temperature.

When the clay reaches the discharge end of the conveyer, the table sections 50 and the side wall sections 55, of course, pass out of contact therewith and the forward pressure exerted on the clay which is still on the conveyer pushes the block ahead where it may enter onto a conveyer belt 78. The block is, of course, continuous and it may be conveniently cut into sections at any suitable time, for instance, when passing from the belt 64 to the belt 78.

Referring now to Fig. 5, I show a kneading roll assembly that is a modification of the type shown in Figs. 1 to 3. In Figs. 1 to 3, each roller is so positioned that its circumferential center line is directly opposite to the space between two rollers in the adjacent rows, whereas in Fig. 5, the rollers 79 are offset in axial directions a lesser distance than in the case of Fig. 1, for example. By this arrangement, there is less sidewise displacement of the clay by the rollers which successively come into contact therewith than where the rollers are offset axially of one another for greater distances.

The roller like members 79 and 17 can, of course, be made integrally, in the form of a single roller having circumferential corrugations or depressions.

I claim as my invention:—

1. Apparatus for shaping articles of plastic material, comprising a traveling table, a roll-supporting member rotatably mounted above said table, rolls mounted on said member and disposed circumferentially of the axis thereof, and means for rotating the said member to bring the rolls into engagement with the material in the table, successively, the peripheries of the rolls being curved in directions axially of the rolls and the rolls being of short length relative to the axial length of said member and being axially offset with respect to one another.

2. Apparatus for shaping articles of plastic material, comprising a traveling table, a roll-supporting member rotatably mounted above said table, rolls mounted on said member and disposed circumferentially of the axis thereof, and means for rotating the said member to bring the rolls into engagement with the material on the table, successively, the rolls being idlingly supported on their journals and having their peripheries curved in directions axially of the rolls, the said curved portions of certain rolls being offset axially with the said curved portion of another roll.

3. Apparatus for shaping articles of plastic material, comprising a movable table, a roll-carrying member rotatably mounted above said table on an axis parallel to the plane of the table, and a plurality of rolls carried by said member and disposed circumferentially thereof, the said rolls being arranged in groups each offset axially with respect to another group, and each group composed of a series of rolls disposed in axial alinement and with their axes in parallelism with the axis of said member, the peripheries of the rolls of each series being curved in directions axially thereof.

4. Apparatus for shaping articles of plastic material, comprising a table, means for reciprocating said table, a roll supporting member disposed above said table, means for rotating said member about an axis parallel to the plane of the table, and rolls carried by said member in position to be brought successively into engagement with material on said table.

5. Apparatus for shaping articles of plastic material comprising a table, means for reciprocating said table, a roll supporting member disposed above said table, means for rotating said member about an axis parallel to the plane of the table, rolls carried by said member in position to be brought successively into engagement with material on said table, and means for effecting vertical adjustment of said roll-carrying member with respect to the surface of the table.

6. Apparatus for operating upon plastic material, comprising a member bodily movable about an axis parallel to the plane of the material, and means for imparting traveling movement to the material in position to effect engagement thereof by the said member which is moved to the material in position to effect engagement thereof by the said member which is moved in the same general direction as the material but at a higher speed.

7. The method of operating upon plastic material, which comprises kneading said material by a member bodily movable through an arcuate path which intersects the surface of the material, and imparting relative traveling movement to said member and the material in addition to the previously-named movement the said member being moved in the same general direction as the material but at a higher speed.

8. The method of shaping articles of plastic material, which comprises kneading the material upon a surface having traveling movement, by downward and forward thrusts against the material.

9. The method of shaping articles of plastic material, which comprises kneading the material upon a surface having traveling movement, by impacting forces applied in directions to effect horizontal displacement of the material laterally of the path of travel at certain points in said path and to effect lateral displacement of the material in opposite directions at other points in said path.

10. The method of shaping articles of plastic material, which comprises kneading the material upon a surface having traveling movement, by impacting forces applied in directions to effect horizontal displacement of the material laterally of the path of travel, alternately in opposite directions.

11. The method of shaping articles of plastic material, which comprises kneading the material upon a surface having traveling movement, by impacting forces applied in directions to effect horizontal displacement of the material laterally of the path of travel alternately in opposite directions, and simultaneously displacing said material in the direction of said traveling movement.

12. Apparatus for shaping articles of plastic material, comprising a traveling table, a roll-supporting member rotatably mounted above said table, roll units mounted on said member and disposed circumferentially of the axis thereof, and means for rotating the said member to bring the roll units successively into engagement with the material on the table, each roll unit having a plurality of annular peripheral recesses to permit of displacement of the material in directions axially of the said unit.

13. Apparatus for shaping articles of plastic material, comprising a traveling table, a roll-supporting member rotatably mounted above said table, roll units mounted on said member and disposed circumferentially of the axis thereof, and means for rotating the said member to bring the roll units successively into engagement with the material on the table, each roll unit having a plurality of annular peripheral recesses to permit of displacement of the material in directions axially of the said unit, and the recesses in one roll unit being offset axially with respect to the recesses of an adjacent unit.

14. Apparatus for shaping article of plastic material, comprising a traveling table, roll-supporting members rotatably mounted above said table and axially spaced in directions longitudinally of the table, with successive supporting members located at higher levels than preceding supporting members, roll units mounted on each of said members and disposed circumferentially of the axis thereof, and means for rotating the said member to bring the roll units successively into engagement with the material on the table, each roll unit having a plurality of annular peripheral recesses to permit of displacement of the material in directions axially of the said unit.

In testimony whereof I, the said FRANK W. PRESTON, have hereunto set my hand.

FRANK W. PRESTON.